Oct. 11, 1955     L. G. SAYWELL     2,720,404
LUBRICANT SEAL
Filed Oct. 16, 1950
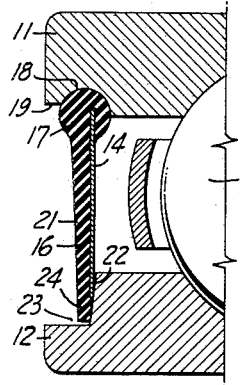
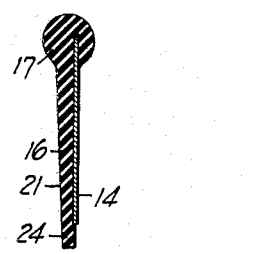
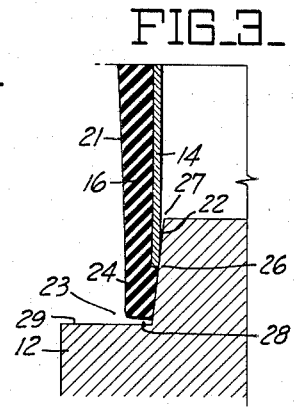
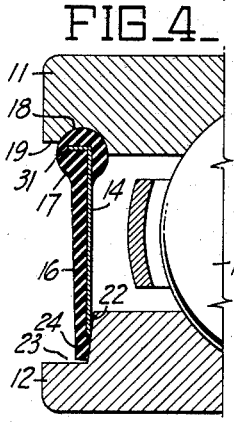
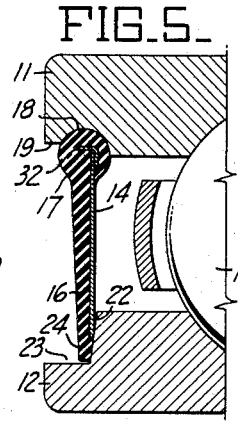
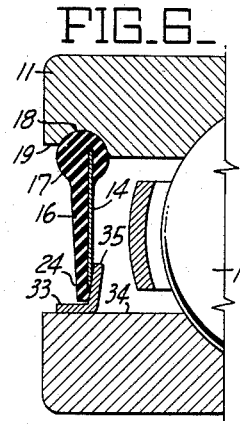
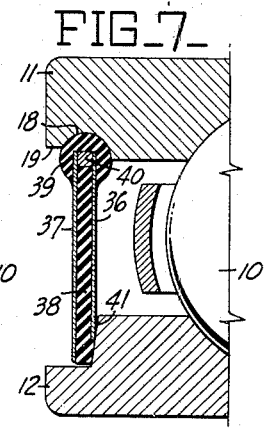
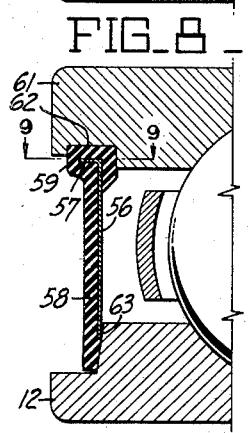
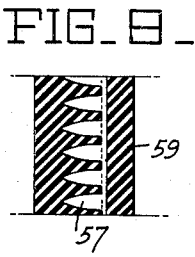
INVENTOR.
Lawrence G. Saywell
BY
ATTORNEYS United States Patent Office 2,720,404
Patented Oct. 11, 1955

2,720,404

LUBRICANT SEAL

Lawrence G. Saywell, San Mateo, Calif., assignor to Saywell Associates, South San Francisco, Calif., a joint venture Application October 16, 1950, Serial No. 190,347

6 Claims. (Cl. 286—11)

This invention relates generally to lubricant seals of the type suitable for preventing loss of lubricant from ball or roller bearing assemblies.

In the past it has been proposed to apply lubricant sealing means directly between the outer and inner races of a ball or roller bearing assembly, thereby providing a self-contained assembly which can be factory lubricated. A simple seal of this character which has been manufactured commercially makes use of a resilient rubber disc or annulus which is retained within the outer race, and which has an inner edge which presses against and thereby seals upon a surface formed on the inner race. The disc may be reinforced by a relatively rigid metal annulus to which it is bonded. While such a seal is superior in many respects to prior constructions, it is subject to the difficulty that in time the rubber tends to take a permanent set, with the result that the rubber annulus no longer makes good sealing engagement with the inner race.

It is an object of the present invention to provide an improved lubricant seal of the above type which makes use of a resilient rubber part, but which is constructed to overcome the above mentioned difficulty.

Another object of the invention is to provide a lubricant seal of the above character which affords both metal to metal and rubber to metal sealing areas, and which is suitable for a wide variety of surfaces.

Another object of the invention is to provide a seal of the above character which is relatively simple to manufacture and install in a ball or roller bearing assembly.

Additional objects of the invention will appear from the following description in which the preferred embodiments have been set forth in detail in conjunction with the accompanying drawing.

Referring to the drawing:

Figure 1 is a cross-sectional detail illustrating one embodiment of the present invention.

Figure 2 is a cross-sectional detail illustrating the sealing device apart from the inner and outer races of the bearing assembly.

Figure 3 is an enlarged cross-sectional detail illustrating a portion of the seal shown in Figure 1.

Figure 4 is a view like Figure 1 illustrating another embodiment of the invention.

Figure 5 is a cross-sectional detail illustrating a modification of the construction shown in Figure 4.

Figure 6 is a cross-sectional view like Figure 1, but showing another embodiment of the invention.

Figure 7 is a cross-sectional view like Figure 1, but showing another embodiment of the invention.

Figure 8 is a cross-sectional view like Figure 1 and illustrating another embodiment of the invention.

Figure 9 is a cross-sectional detail taken on the section line 9—9 of Figure 8.

Referring to Figures 1 to 3 inclusive of the drawing, I have illustrated a ball bearing assembly 10 including the outer and inner races 11 and 12. The sealing means consists of an annulus comprising the spring metal part 14, and the resilient rubber part 16. The spring metal part 14 is a relatively flat annulus formed of thin spring metal. For example this part can be formed of high carbon steel, Phosphor bronze, or any one of the so-called stainless steels. It may vary in thickness from say 0.003 to 0.008 inch. The rubber part can be formed of suitable synthetic rubber or like resilient material which is not detrimentally affected by contact with oil.

The outer peripheral portion 17 of the resilient part is formed bead-like as illustrated. This portion is seated within an annular groove 18 formed in the outer ball bearing race 11. The dimensions are such that by some compression of the rubber forming the portion 17, the complete annulus can be pressed through the bore 19 of the outer race, whereby upon expansion it seats itself within the groove 18 and forms good sealing contact with the outer race. The front wall portion 21 of the resilient rubber part is bonded to the adjacent face of the spring metal part 14. The outer periphery of the spring metal part is embedded in and bonded to the bead-like rubber portion 17.

The inner ball bearing race 12 is shown provided with a shoulder face 22, which is formed by machining a recess 23 in the end of the race. The axial relation between the shoulder face 22 and the groove 18 is such that when the annulus is installed in the bearing assembly the spring metal part 14 is sprung laterally within its elastic limit, whereby its inner margin is pressed into sealing engagement with the shoulder face 22 as illustrated. The inner rubber margin 24 is stressed laterally whereby it likewise presses against the shoulder face 22. Instead of forming the shoulder face 22 coincident with a plane at right angles to the axis of the ball bearing assembly, it is preferably formed at a slight bevel as illustrated. In other words when viewed in contour as illustrated in Figure 1, the shoulder face 22 is at a small angle to a plane at right angles to the assembly. This angle may be of the order of from say 3 to 9°.

Figure 2 illustrates the sealing annulus before its installation in a ball bearing assembly. Figure 3 illustrates the manner in which the inner margins of the spring metal and rubber parts are urged into sealing engagement with the shoulder face 22. Note that some bending of these parts takes place because of the lateral stressing previously described. The greatest pressure between the spring metal part 14 and the shoulder face 22 occurs in the region indicated at 26, or in other words at the outer periphery of the spring metal part 14. The angle at which the shoulder face 22 is formed enables the maximum pressure to be developed at this region, with minimum pressure or preferably a slight clearance in the region 27, which corresponds to the outer periphery of the shoulder face. Thus the loading between the shoulder face and the adjacent surface of metal part 14 is graduated, although the area of interface contact has a radial extent which is many times the thickness of the metal part. Note that at the region 27 between the inner periphery of the rubber part 16 and the adjacent cylindrical surface 29 of the inner race, there is only a relatively small clearance 28. This is desirable in that it tends to prevent the entrance of dirt and other foreign material between the surfaces in rubbing and sealing contact.

It will be evident from the foregoing that the sealing arrangement illustrated in Figures 1 to 3 inclusive provides both metal to metal and rubber to rubber sealing areas, thereby effectively preventing the loss of lubricant and likewise preventing the entrance of dust or external liquids into the interior of the bearing. The spring metal member 14 serves the double purpose of providing a metal to metal seal, and maintaining the resilient rubber in sealing engagement with the surface 22. If it should happen that the inner margin 24 of the rubber should take such a permanent set that it no longer makes good sealing contact with the shoulder face 22, the device does not completely lose its effectiveness, because of the continued metal to metal seal established between the spring metal part and the shoulder face 22.

In the foregoing reference has been made to establishing a metal to metal contact between the spring metal part 14 and the shoulder face 22. While it is possible to have a direct metal to metal contact, I prefer to provide the inner face of the spring metal part with a thin flexible composite coating which will reduce friction and wear. A good coating material is one consisting of a number of divided solid ingredients, including graphite and one or more divided metals in flake form, which are bonded together in a homogeneous mass by a thermally set synthetic resin.

The following is an example of a formula which can be used with good results as an antifriction coating material:

5 grams phenolformaldehyde resin in the form of a powder.
0.4 gram amorphous graphite.
1.7 grams lead in flake form having a particle size of about 320 mesh.
1.7 grams copper in flake form having a particle size of about 320 mesh.

The above ingredients are homogeneously mixed together and the resin content dissolved with a suitable solvent such as a mixture of ethyl, isopropyl and butyl alcohols. Thus a fluid mixture is provided which can be sprayed, brushed on or applied by dipping. The surface to be coated is first suitably cleaned, as by sanding or sandblasting and then the above fluid composition applied. After applying one or more coats, followed by air drying, the coating is cured by heating the same in a suitable oven to a temperature of the order of 300° F. or higher, to thermally set the resin. The thickness of such a coating may be of the order of 0.001 to 0.002 inch.

In the embodiment illustrated in Figure 4 the parts are substantially the same as in Figures 1 to 3 inclusive. However a flange 31 is formed on the outer periphery of the metal part 14, and this flange is embedded in and bonded to the rubber forming the bead-like portion 17. The flange 31 can be either an uninterrupted rim, or it can be slotted or severed to form the effect of finger springs.

In the embodiment illustrated in Figure 5, the parts are likewise substantially the same as in Figures 1 to 3 inclusive. However in this instance the spring metal part 14 is embraced by a relatively rigid ring 32, which is L-shaped in cross-sectional contour. The spring is embedded in and bonded to the rubber forming the bead-like portion 17, and serves to prevent the application of radially applied forces to the spring metal part.

In the embodiment of Figure 6 the sealing annulus is substantially the same as illustrated in Figure 2. However instead of employing a shoulder face 22 formed by machining a recess in the inner race, I have employed an annular member 33 which can be formed of suitable pressed metal, and which is substantially L-shaped in cross-sectional contour. The inner diameter of this member is proportioned whereby it can be positioned upon the cylindrical surface 34 of the inner race, with a press fit. The shoulder face 35 of the member 33 can be formed on substantially the same angle as the shoulder face 22 of Figure 1.

Figure 7 illustrates an embodiment of the invention in which two spring metal parts 36 and 37 are employed. These parts are bonded to the opposite faces of the resilient rubber part 38. Both of the metal parts 36 and 37 have their outer peripheral edges spaced by ring 40 and bonded to the bead-like portion 39. Both the inner margin of the spring metal part 36, and the inner margin of the resilient rubber part, are in sealing engagement with the shoulder face 41 formed on the inner ball bearing race. The inner diameter of the part 37 is substantially less than that of part 36, whereby the inner margin of part 37 urges the inner margin of the rubber part into sealing engagement with the shoulder face 41. This serves to offset any tendency for the rubber to take a permanent set with resulting impairment of the seal.

Figures 8 and 9 show a modified construction for mounting the annulus in the outer ball bearing race. In this instance the spring metal part 56 is provided with an outer flange or rim which is slotted to provide a plurality of finger springs 57. The resilient rubber part 58 has an outer flange or thickened rim portion 59 within which the finger springs are embedded and bonded thereto. The outer race 61 is provided with a shallow groove 62 within which the rim portion 59 is seated. The finger springs after installation are sprung inwardly whereby they tend to maintain sealing contact between the outer peripheral surface of portion 59 and the base of the groove 62. The spring metal annulus is sprung laterally within its elastic limit whereby its inner margin is urged into sealing contact with the shoulder face 63. Likewise the inner margin of the rubber part is urged into sealing engagement with the same shoulder face.

It will be evident from the foregoing that I have provided a sealing annulus of simple construction which can be readily applied to conventional ball or roller bearing assemblies. It is only necessary to modify the inner and outer races whereby the annulus can be seated within the outer race, with lateral stressing of the spring metal part to establish and maintain a seal with the inner race. The embodiments which provide both metal to metal and metal to rubber seals are deemed particularly desirable for many purposes, because the rubber to metal seal tends to prevent entrance of dust or external liquids, whereas the metal to metal seal is particularly effective to prevent loss of lubricant. The seal is likewise an improvement over prior devices which rely upon the resiliency of a rubber part to maintain a rubber to metal sealing contact. As previously pointed out with such structures when the rubber tends to take a set the seal is permanently impaired.

I claim:

1. In a lubricant sealing assembly, outer and inner annular concentric members, a lubricant sealing means extending between said members and including a thin spring metal annulus and a resilient rubber annulus, said annuluses being bonded together, the outer peripheral portion of the rubber annulus being seated within and sealed to the outer annular member, both the inner margin of the spring metal annulus and the inner margin of the resilient rubber annulus being in sealing engagement with the inner member, the spring metal annulus being stressed laterally within its elastic limit to urge said margins against said inner member to thereby maintain sealing relation.

2. In a lubricant sealing assembly, outer and inner ball bearing races, a lubricant sealing means extending between said races and including a thin spring metal annulus and a resilient rubber annulus, said annuluses being bonded together, the outer periphery of the spring metal annulus being embedded in a bead-like portion of the resilient rubber, said bead-like portion being seated within and sealed with respect to the outer race, an annular shoulder face formed on the inner race, the inner margins of both the spring metal annulus and the resilient rubber annulus being in sealing engagement with said shoulder face, said spring metal annulus being sprung laterally within its elastic limit to urge said margins into sealing relation with said shoulder face.

3. An assembly as in claim 1 in which the inner member has a shoulder face which in sectional contour is at a small angle to a plane at right angles to the axis of the members.

4. In a lubricant seal, outer and inner annular concentric members, a lubricant sealing means extending between said members and including a thin spring metal annulus which has an outer flange portion formed of a plurality of spring fingers, an annulus formed of resilient rubber bonded to said spring metal annulus, said resilient rubber annulus being bonded to said spring metal annulus and embedding said spring fingers, said rubber annulus having its outer portion seated within and sealed with respect to the outer member, the inner margin of said resilient rubber annulus being in sealing contact with an annular surface on the inner member, said spring metal annulus being stressed laterally within its elastic limit to urge said resilient rubber annulus into sealing engagement with the inner member.

5. A lubricant seal as in claim 2 together with a second spring metal annulus, said second annulus having its outer periphery embedded in said bead-like portion and extending substantially completely over the exterior face of the resilient rubber annulus.

6. In a lubricant sealing assembly, outer and inner ball bearing races, a lubricant sealing means extending between said races and including an inner and an outer thin spring metal annulus and a resilient rubber annulus interposed between the spring-metal annuluses, said annuluses being bonded together, the outer peripheries of the spring-metal annuluses being embedded in a bead-like portion of the resilient rubber, said bead-like portion being seated within and sealed with respect to the outer race, an annular shoulder face formed on the inner race, the inner margins of both the inner spring metal annulus and the resilient rubber annulus being in engagement with said shoulder face, the inner diameter of the outer spring metal annulus being less than that of the inner spring metal annulus whereby it overlies the inner margin of the rubber annulus, said inner and outer spring metal annuluses being sprung laterally within their elastic limit to urge both said margins into sealing relation with said shoulder face.

References Cited in the file of this patent
UNITED STATES PATENTS

| | | |
|---|---|---|
| 1,891,706 | De Ram | Dec. 20, 1932 |
| 2,245,474 | Hately | June 10, 1941 |
| 2,352,784 | Geyer | July 4, 1944 |
| 2,428,041 | Saywell | Sept. 30, 1947 |
| 2,467,049 | Peterson | Apr. 12, 1949 |
| 2,600,433 | Saywell | June 17, 1952 |